UNITED STATES PATENT OFFICE.

LEON LILIENFELD, OF VIENNA, AUSTRIA-HUNGARY.

FILM AND PROCESS OF PRODUCING SAME.

1,217,027.      Specification of Letters Patent.      Patented Feb. 20, 1917.

No Drawing. Original application filed March 14, 1913, Serial No. 754,333. Divided and this application filed October 20, 1913. Serial No. 796,248.

*To all whom it may concern:*

Be it known that I, Dr. LEON LILIENFELD, a subject of the Emperor of Austria-Hungary, and residing at Vienna, Austria-Hungary, have invented certain new and useful Improvements in Films and Processes of Producing Same, of which the following is a specification.

I have found, that alkyl derivatives of cellulose or of its conversion products or derivatives, that is to say, compounds of cellulose, or of its conversion products or derivatives in which one, several or all of the hydrogen atoms of the hydroxyl groups of the cellulose are replaced by alkyl radicals, such as methyl, ethyl, propyl or the like or in other words, in which the cellulose has been partly or wholly alkylated, are substances which either alone or in combination with other suitable bodies, especially with such substances which by their action impart softness or plasticity, may be advantageously used for producing films. These alkyl-ethers of cellulose for instance the ethyl-ethers of cellulose are, according to my researches adapted to replace with great advantage the cellulose esters, such as cellulose nitrates, cellulose acetates, cellulose xanthogenates or the like, in the manufacture of films, more particularly for photographic purposes.

The ethers of cellulose may, for instance, be obtained by the process described and claimed in my copending application 706,009. The preparation of these ethers is also described in British Patents Nos. 12854 of 1912 and 6035 of 1913.

The superiority of the alkyl ethers of cellulose for the manufacture of such films is due to the following advantages:—

1. Their extreme permanency or stability and their extreme neutrality. They withstand being heated in the presence or absence of water; they are also resistant to hot alkaline solutions. They possess a greater stability than any of the simple or mixed cellulose esters as well as of all hitherto known conversion products or derivatives of cellulose.

2. The great flexibility or suppleness and resistance to chemical and physical influences and the remarkable tenacity, strength and toughness of the "skins" or films produced from their solutions or jellies, by evaporation.

3. Their property of dissolving easily and readily in a very great number of solvents.

4. Their relative inflammability, as compared with cellulose and also as compared with cellulose nitrates.

Since the number of solvents (simple and mixed) for the cellulose ethers is very large, they may be treated in combination with a very large number of softening agents and colloiding mediums.

The large number of solvents renders it also possible to combine the ethers of cellulose with many colloids or binding substances and plastic bodies, with which the hitherto known and used cellulose derivatives could not be combined.

I may for instance combine the alkyl derivatives of cellulose which are soluble in organic solvents with the following substances: cellulose-nitrates (nitro-celluloses), cellulose formates, cellulose acetates (acetyl-celluloses) and the like, camphor and the substitutes for camphor employed in the celluloid industry (such as naphthalene, phosphoric acid esters of the phenols, etc.), resins and the resinous condensation products of phenols and aldehydes or of aromatic amins and aldehydes, non-drying oils, oxidized and unoxidized drying oils, rubber, guttapercha, balata, rubber substitutes, metallic resinates and oleates, waxes, paraffins, fats, glycerin and the like.

The manufacture of the films is carried out in the same manner as in the case of films made with the hitherto used cellulose derivatives such as cellulose nitrates, cellulose acetates or the like. The choice of suitable solvents for ethers of cellulose is much wider than for the hitherto known cellulose derivatives. Thus, for instance, some cellulose ethers, for example, some of the ethyl ethers, are soluble in alcohol, methyl-alcohol, glacial acetic acid, formic acid, pyridin, quinolin, picolin, di-chlorhydrin, epi-chlorhydrin or the like, nitro-benzene, ethyl-acetate, ethyl-phthalate, ethyl-sebacate, ethyl-citrate, ethyl-succinate, ethyl-tartrate, amyl-acetate, butyl-acetate, ethyl-benzoate, ethyl-levulinate, and the like, acetone, pentachlor-ethane, tetrachlor-ethane, trichlorethylene, acetylene dichlorid, carbon tetrachlorid, chloroform or the like, benzene, toluene, xylene, phenol, nitro-phenols, orthocresol or the like, naphthalene, toluidin, anilin or the like, formanilid, acetanilid or the like, turpentine oil, camphor, castor oil, linseed oil, Chinese wood oil, olive oil or the like, vaseline oil, paraffin oil, naphtha (petroleum), vaseline or the like, stearin, beeswax, Japan wax, lanolin or the like, nitromethane, phenyl-ethers, tri-phenyl phosphate, tri-cresyl phosphate, etc.

Consequently differences in the manufacture of the films can occur, partly in choosing the solvents employed, and partly in the use of additions of substances which impart plasticity for example softening substances. As the manufacture of the films accordingly to the present invention corresponds from principle with the manufacture of said films known for the cellulose esters only the products being new and having peculiar advantageous properties as hereinbefore described, it is not necessary to describe said manufacture in detail.

The films containing alkyl ethers of cellulose are suitable for all purposes for which films are used, for instance for photographic purposes as foundations for light-sensitive layers or as a substitute for glass, sheets or foil of nitro-cellulose or celluloid or other cellulose derivatives, further as a substitute for gelatin or the like for ornamentation, packing, etc.

The new films are distinguished by their great stability, by the fact that they remain unaltered when treated with watery or alcoholic solutions of alkalis and by the fact that they do not alter the light sensitive emulsion, since the substances do not decompose while stored. They can be kept for a long time without altering.

In order to carry out the manufacturing of films the alkyl ethers of cellulose for instance the ethyl ethers of cellulose are dissolved, either alone or in mixture with softening agents such as tricresylphosphate, triphenylphosphate, or the like, and this solution is then spread on a suitable base or support and dried.

*Example No. I.*

A cellulose ether, for instance a cellulose ethyl ether is dissolved in a suitable organic solvent, for instance alcohol or benzene or the like, or in a mixture of organic solvents, for instance a mixture of alcohol and benzene or toluene, or alcohol and ether or the like, and the solution, after having been filtered, if necessary, is manufactured into films on suitable pouring tables or by means of suitable pouring or spreading machines in the usual manner, for instance, by drying and afterward detaching from the foundation.

*Example No. II.*

This differs from Example No. I in that the solutions contain an addition of substances that impart suppleness, such as phosphoric acid esters of the phenols, for instance tri-cresyl phosphate or tri-phenyl phosphate or camphor or the like.

It is to be understood that the films may also be made by planing or shaving or cutting from blocks consisting of cellulose ethers or containing cellulose ethers.

The films containing cellulose ethers are suitable for all purposes for which films are used, for instance for photographic purposes as foundations for light-sensitive layers or as a substitute for glass, sheets or foil of nitro-cellulose or celluloid or other cellulose derivatives, further as a substitute for gelatin or the like for ornamentation, packing, etc.

This application is a division of my copending application, Serial Number 754,333, filed March 14, 1913.

I do not, in the present case, make any claim to the cellulose ethers *per se*, nor broadly to compositions comprising the same mixed with other materials capable of increasing the plasticity thereof, nor to mixtures of such ethers with solvents, nor to threads or other textile materials made of cellulose ethers such inventions being claimed in my copending applications, Serial No. 706,009, filed June 26, 1912, (now Patent 1,188,376) No. 754,333, filed March 14, 1913, No. 796,249, filed October 20, 1913.

What I claim is:—

1. A film containing an ether of cellulose, in admixture with a material capable of increasing the suppleness thereof.

2. A film containing an ether of cellulose, in admixture with tricresyl phosphate.

3. A method of making a transparent flexible film, which comprises adding a substance capable of imparting suppleness, and a cellulose ether, to a common solvent, and spreading the solution thereby produced, on a suitable surface, allowing the solution to dry, and separating the film from the said surface.

4. A method of making a transparent flexible film, which comprises adding a substance capable of imparting suppleness, and a cellulose ether, to a common solvent, said solvent comprising a plurality of liquids mixed together, and spreading the solution thereby produced, on a suitable surface, allowing the solution to dry, and separating the film from the said surface.

5. The process of making films which comprises dissolving a cellulose ether in a solvent, spreading the solution thereby produced upon a suitable surface, allowing the solution to dry and separating the film from said surface.

6. A process of making film which comprises dissolving an ether of cellulose in a solvent comprising alcohol and an ester of a phenol, and converting said solution into films.

7. A film containing as ingredients thereof, an ether of cellulose and a phosphoric acid ester of a phenol.

8. A film composed of a material containing an alkyl ether of cellulose which is practically insoluble in water, but soluble in some organic solvents, together with a substance capable of increasing the plasticity of the mass.

9. A film containing an ether of cellulose in admixture with an ester of a phenol.

In testimony whereof I have signed my name to this specification in the presence of two subscribing witnesses.

Dr. LEON LILIENFELD.

Witnesses:
HERMAN WUNDERLICH,
AUGUST FUGGER.